UNITED STATES PATENT OFFICE.

JOHN HARVEY KELLOGG, OF BATTLE CREEK, MICHIGAN.

FOOD PRODUCT.

1,001,150.  Specification of Letters Patent.  Patented Aug. 22, 1911.

No Drawing.  Application filed October 19, 1908.  Serial No. 458,552.

*To all whom it may concern:*

Be it known that I, JOHN HARVEY KELLOGG, a citizen of the United States, residing at Battle Creek, Calhoun county, Michigan, have invented certain new and useful Improvements in Food Products, of which the following is a specification.

This invention relates to improvements in Food Products.

The main object of this invention is to provide an improved food product which is very palatable and nourishing and one which is well adapted for use as a meat substitute.

A further object is to provide an improved food product embodying these advantages which can be economically produced.

Still further objects will definitely appear from the detailed description to follow.

The invention is clearly defined and pointed out in the claim.

In the preparation of my improved food product, I use the following ingredients, preferably in about the following proportions: casein, wet, three parts; gluten, wet, three parts; an oil,—when a vegetable oil is used, about two parts; and yeast products, either in the form of concentrated yeast extract, or what I designate as crude yeast product,—that is, the yeast cells and their contents together. When the extract is used, from two to four grams to the pound of the other ingredients; and, when the crude product is used, from one to two ounces of the other ingredients. I preferably prepare and combine these ingredients in the following manner: I prepare the gluten preferably from wheat flour by washing out the starch. I preferably precipitate the casein in milk with acetic, hydrochloric or sulfuric acid. The yeast product I preferably prepare from the waste brewery yeast by first diluting the same with water, and washing through a fine sieve to remove the bitter hop resin which is, for the most part, to be found in particles coarser than yeast. I then remove the water, preferably by placing the mixture in a suitable filtering fabric, and pressing. The moist yeast thus obtained is then mixed with from two to five per cent. of salt, under the influence of which the yeast envelops are broken and the soluble matters contained therein are set free, the mass becoming liquefied to the consistency of cream. This, which I designate as the crude yeast product, may be used, or water may be added and filtered and the liquid concentrated; or, if desired, it may be used without concentrating to moisten the other ingredients.

The ingredients are preferably mixed by passing through a shredding machine, during which operation the oil is added. I desire to remark that the oil may be omitted, and a satisfactory product still be secured, the oil being added, if desired, at the time of preparation for use. I preferably use a vegetable oil, such as corn or nut oil, although other oils may be used, and I find butter quite satisfactory.

After thoroughly mixing the ingredients, the mixture is placed in cans and cooked. The temperature of the cooking may be considerably varied, but it is preferably from 180 to 220 degrees Fahrenheit, or this temperature may be increased, if desired. I will state, however, that the higher the temperature, and the longer the cooking is continued, the darker and more highly flavored will be the product. After the cooking, the food is ready for serving and may be either served directly from the cans, or prepared in a great variety of ways.

The product, by this treatment, is given a meaty consistency, and is very like meat in flavor and also as to its food elements.

The yeast extract, particularly where it is concentrated, possesses a flavor very like that of meat extract, and, as the other elements also are meaty in their nature, I secure a product which is a very satisfactory substitute for flesh foods. It is very nourishing and may be used in a great variety of ways. If desired, my improved food product may be dried into a powder for use in the making of soups, broths, and similar preparations; or, where it is desired to transport it for considerable distances, as, for example, for the use of travelers, or the like, as its weight is thereby decreased and it is of comparatively small bulk.

The ingredients are so combined that they become entirely homogeneous and are fixed in this condition,—that is, they do not separate under the ordinary treatments for serving.

My improved food product has very excellent keeping qualities, and is comparatively economical. While the process I have described is preferred by me on account of its simplicity and economy, I am aware that there are various means of accomplishing the same results. Further, I desire to remark that the proportions of the ingredients may be very considerably varied, and satisfactory results still be secured.

Having thus described my invention, what I claim as new and desire to secure by Letters Patent is:

An improved food compound comprising casein, gluten, oil and a yeast product combined in about the proportions specified and cooked substantially as described into a homogeneous mixture having a meat-like flavor.

In witness whereof, I have hereunto set my hand and seal in the presence of two witnesses.

JOHN HARVEY KELLOGG. [L. S.]

Witnesses:
E. E. SMITH,
LETHA PETTENGILL.